United States Patent [19]

Grigo et al.

[11] 4,287,108

[45] Sep. 1, 1981

[54] MIXTURES OF POLYPROPYLENE AND LIQUID SATURATED DIORGANOPOLYSILOXANES

[75] Inventors: Ulrich Grigo, Krefeld; Leo Morbitzer, Cologne; Klaus-Peter Arlt, Senden; Rudolf Binsack, Krefeld; Josef Merten, Korschenbroich, all of Fed. Rep. of Germany

[73] Assignee: Bayer Aktiengesellschaft, Leverkusen, Fed. Rep. of Germany

[21] Appl. No.: 119,940

[22] Filed: Feb. 8, 1980

[30] Foreign Application Priority Data

Feb. 13, 1979 [DE] Fed. Rep. of Germany ....... 2905357

[51] Int. Cl.³ ...................... C08L 23/12; C08L 83/04
[52] U.S. Cl. ............................. 260/29.1 SB; 525/106
[58] Field of Search ................. 260/29.1 SB; 525/106

[56] References Cited

U.S. PATENT DOCUMENTS

| | | | |
|---|---|---|---|
| 2,655,489 | 10/1953 | Lawson | 260/29.1 SB |
| 2,888,419 | 5/1959 | Safford | 260/29.1 SB |
| 2,992,201 | 7/1961 | Gober | 260/29.1 SB |
| 3,326,880 | 6/1967 | Binsbergen | 525/4 |
| 3,865,897 | 2/1975 | Falender et al. | 525/106 |

FOREIGN PATENT DOCUMENTS

| | | | |
|---|---|---|---|
| 639930 | 4/1962 | Canada | 525/106 |
| 843665 | 8/1960 | United Kingdom | 525/106 |
| 1224035 | 3/1971 | United Kingdom . | |
| 1294986 | 11/1972 | United Kingdom . | |

OTHER PUBLICATIONS

Derwent Abs. 41756A/23, (SU 565922), Aug. 25, 1977, "Heat Stable . . . Ethylene–Propylene Copolymer . . . and Liq. Poly:ethylene:siloxane".
Derwent Abs. 32376Y/18, (SU 521293), "Vulcanizing Nonpolar Rubber Comp. . . . and Liquid Polymethyl or Polyethylsiloxane . . . ", Oct. 19, 1976.
Derwent Abs. 12230B/07, (DT 2821807), "Flame-resist Insulating Comp. . . . Polyolefin Together with Organo Polysiloxane Rubber . . . ", Aug. 2, 1979.
Derwent Abs. 14704V/08, "Plastics/Rubber Electrical Insul. Mat. Contg. an Organosiloxane . . . ", (J7-40-04-815), Feb. 4, 1974.
Derwent Abst., "Electric Insulator . . . ", (DT 2217795), Oct. 19, 1972, Celanese Corp.
Derwent Abst., "Mould for Concrete Construction . . . Polypropylene", (J78001-768), Jan. 21, 1978.
Derwent Abst., (J48028-542), Apr. 16, 1973, "Liquid Repellent Thermoplastic Mouldings-Contg. Silicone Polym. & Polypropylene . . . ".
Derwent Abst., 65188W/39, "Polypropylene Compsn.-Cont. Poly-dimethyl Siloxane Rubber as Elastomer to Improve Properties", (SU 455124), 3-13-75.

Primary Examiner—John C. Bleutge
Assistant Examiner—Herbert J. Lilling
Attorney, Agent, or Firm—Connolly and Hutz

[57] ABSTRACT

A homogeneous, thermoplastic mixture comprising (A) from 85 to 99.5% by weight of isotactic polypropylene; and (B) from 15 to 0.5% by weight of a liquid, saturated diorganopolysiloxane having a viscosity of from 30,000 to 80,000 cSt at 20° C.

The elastic properties of moulded articles produced from the polypropylene/diorganopolysiloxane mixtures of the present invention are substantially improved by the addition of small quantities of diorganopolysiloxane while their dimensional stability under heat and their rigidity are largely preserved.

7 Claims, 2 Drawing Figures

MIXTURES OF POLYPROPYLENE AND LIQUID SATURATED DIORGANOPOLYSILOXANES

The present invention relates to homogeneous, thermoplastic mixtures of isotactic polypropylene and liquid, saturated diorganopolysiloxanes which siloxanes have viscosity within a certain range.

It is known from Belgian Patent No. 648,526 corresponding to U.S. Pat. No. 3,326,880 to mix predominantly crystalline homopolymers or copolymers of monoolefinically unsaturated hydrocarbons having from 2 to 4 carbon atoms, in particular propylene, with 0.01 to 5% by weight, based on the weight of mixtures, of alkali metal salts of branched chain acyclic saturated monocarboxylic acids having not more than 12 C-atoms. Up to 20% by weight, based on the weight of the whole mixture, of rubber-like substances such as silicone rubbers may be incorporated in the molten mixture for further improving the mechanical properties. Such saturated silicone rubbers have molecular weights of from ca. 200,000 to 2,000,000 (see German Auslegeschrift No. 1,669,851, column 4 lines 1–8). According to "Chemie und Technologie der Silicone" by W. Noll, 1968, publishers Verlag Chemie, GmbH, Weinheim/Bergstrasse, page 332, Chapter entitled "Siliconkautschuk-Typen", the usual commercial silicone rubbers are based mainly on polymeric chain dimethylpolysiloxane having molecular weights of from ca. 300,000 to 700,000.

From German Auslegeschrift No. 2,430,949, it is also known that cross-linkable mixtures of polypropylene and a diorganopolysiloxane rubber containing vinyl or allyl groups can be produced with a Williams plasticity above 0.0508 cm (according to ASTM-D-926-67).

Finally, it has been proposed to mix low molecular weight, liquid diorganopolysiloxanes having viscosities of up to 3000 cSt (centistokes) at 25° C. with polyethylene and to mould the mixtures thus obtained by extrusion, optionally with cross-linking. The addition of diorganopolysiloxanes is said to have the desirable effect of preventing the shaped products such as sheets, films, tablets, granules, etc. from sticking or caking together (see U.S. Pat. No. 2,992,201) and of preventing corona discharges when the products are used for electrical purposes (see British Patent Specification No. 1,294,986).

It has now surprisingly been found that liquid saturated diorganopolysiloxane having a viscosity in the range of from 30,000 to 80,000 cSt at 20° C. have a lasting effect on the mechanical properties of isotactic polypropylene even when added in only small quantities. The elastic properties of moulded articles produced from the polypropylene/diorganopolysiloxane mixtures of the present invention are substantially improved by the addition of small quantities of diorganopolysiloxane while their dimensional stability under heat and their rigidity are largely preserved.

The permanent elongation, which is a measure of the elasticity of moulded products, decreases markedly with increasing quantities of diorganopolysiloxane within the range of from 0.5 to 15% by weight. Diorganopolysiloxane additions of 3 to 7% by weight have proved to be particularly advantageous.

Another advantage of the moulded products of polypropylene and diorganopolysiloxane obtained from the mixtures of the present invention is their improved notched impact strength. Although the added oligomeric diorganosiloxanes have a cold setting point below −40° C., the dimensional stability under heat, expressed as the Vicat temperature, of moulded products obtained from mixtures of the present invention is only slightly reduced.

In order to obtain the improvements in properties mentioned above, it is important to use diorganopolysiloxanes having a viscosity in the range of from 30,000 to 80,000 cSt, determined at 20° C. Diorganopolysiloxanes having viscosities below 30,000 cSt are less suitable because they are readily exuded in the course of processing. Very highly viscous diorganopolysiloxanes, with viscosities above 80,000 cSt are also less suitable possible because their rate of diffusion is not sufficient to enable them to be distributed sufficiently rapidly within the polymer workpiece in the event of mechanical stress, e.g. elongation.

The present invention therefore provides a homogeneous, thermoplastic mixture comprising (A) from 85–99.5% by weight of isotactic polypropylene and
(B) from 15–0.5% by weight of liquid, saturated diorganopolysiloxanes having a viscosity of from 30,000 to 80,000 cSt at 20° C.

The mixtures are preferably composed of from 93 to 97% by weight of Component A and from 3 to 7% by weight of Component B.

The diorganopolysiloxanes used may be dialkylpolysiloxanes having from 1 to 4 C-atoms in each alkyl group, diphenylpolysiloxanes and methyl-phenylpolysiloxane provided they are within the given viscosity range.

The above mentioned dialkylpolysiloxanes particularly dimethylpolysiloxanes, are especially effective.

The given viscosity range corresponds to a molecular weight average in the range of from ca. 65,000 to 100,000.

The average molecular weights of the polyorganosiloxanes suitable for the invention were determined according to Barry's equation (see W. Noll, "Chemie und Technologie der Silicone", 1968, publishers Verlag Chemie GmbH, Weinheim/Bergstr., pages 218/219, Chapter "Kettenpolymere") from the intrinsic viscosities of the oils.

The isotactic polypropylene which is suitable for use in the mixtures of the present invention preferably has an isotactic portion of more than 90% by weight and a melt index (MFI) of from 0.1 to 20 g/10 min at 230° C. and under a load of 5 kg according to DIN 53 735 (draft). Relatively high molecular weight polypropylenes having a melt index (MFI) of from 0.1 to 5 g/10 min at 230° C. and under a load of 5 kg have proved to be particularly suitable.

Isotactic polypropylene is prepared in known manner by the Ziegler-Natta process, using known catalyst systems such as titanium-III chloride/triethylaluminium or diethylaluminium chloride.

In order to achieve optimum utilisation of the elasticising effect of the diorganopolysiloxanes used in the present invention in the polypropylene (PP), the polysiloxanes should be incorporated as homogeneously as possible in the polypropylene. The mixing with polypropylene may be carried out either at room temperature, followed by heating of the mixture under the action of shearing forces, or simply during melting of the polypropylene.

The mixing temperature must, however, be high enough to enable the synthetic material to soften completely and form a very uniform mixture. When mixing is carried out in a kneader or extruder, the temperature should generally be from 170° to 270° C. If desired, pigments, fillers, stabilisers, light protective agents or other modifying ingredients may be incorporated with the mixture.

In order to obtain optimally low permanent elongation, the diorganopolysiloxane must be homogeneously distributed in the PP. When elongation tests are carried out on shoulder rods of such optimally produced material, no formation of a neck on the shoulder is observed in the mixture of polypropylene/diorganopolysiloxane, in contrast to pure polypropylene, where formation of a pronounced shoulder neck is observed. The silhouettes of stretched shoulder rods (length 875 mm, thickness 1 mm; after 100% elongation) are illustrated in FIGS. 1 and 2.

Figure 1:
FIG. 1 is an illustration of a stretched rod of pure polypropylene.
Figure 2:
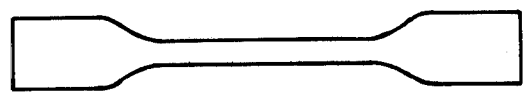
FIG. 2 is an illustration of a stretched rod of a composition of this invention.

FIG. 1 represents the silhouette of a stretched shoulder rod of pure propylene and FIG. 2 the silhouette of a stretched shoulder rod formed from a mixture of polypropylene/dimethylpolysiloxane according to Example 2 below.

Electronmicroscopic photographs of a cross-section through a sample may be used to determine whether the diorganopolysiloxane is homogeneously distributed in the polypropylene.

Compared with pure polypropylene, the mixtures of the present invention show a marked improvement in elastic properties such as permanent elongation and notched impact strength. The mixture of the present invention therefore open up the possibility of producing heat moulded articles having high polyolefine contents, i.e. high dimensional stability in heat and improved elasticity.

EXAMPLES 1-3 and COMPARISON EXAMPLE 1 (Table 1)

The polypropylene (PP) used in the mixtures and in comparison Example 1 had an isotactic content of 96% by weight and a melt index of 3.0 g/10 min at 230° C. under a load of 5 kg. The dimethylpolysiloxane had a viscosity of 50,000 cSt at room temperature (20° C.) and a cold setting point of ca. −40° C. Before the mixing operation proper, the dimethylpolysiloxane was vigorously stirred up with the PP powder in the given proportions. The resulting mixture was introduced into a 1 liter internal kneader, model GK 4 SU of Werner & Pfleiderer, Stuttgart, which had been preheated to 170° C., and was vigorously kneaded inside the apparatus for 7 minutes at a speed of 100 revs/min and a ram pressure of 2.5 excess atmospheres. During this operation, the reaction temperature rose to 200°-210° C. The kneaded product was then rolled out into a sheet on a roller (roller temperature ca. 150° C.) and granulated.

Test samples according to DIN 53 504, No. 3 (Standard shoulder rod, length 180 mm, thickness 4 mm) were carried out on a digitally controlled injection moulding machine (model ES 110-60) of Engel KG, Schwertberg, Austria, using a screw speed of 130 revs/min, an injection pressure of 1075 bar and a nozzle temperature of 230° C.

The test samples required for the various tests were removed mechanically from the test sample conforming to DIN 53 504, No. 3.

The test samples for measuring permanent elongation (Standard shoulder rod: length 75 mm, thickness 1 mm) were punched out of 1 mm thick pressed plates.

The results of the tests obtained in the individual Examples are summarised in Table 1.

Examples 1-3 clearly show that the elastic properties such as permanent elongation and notched impact strength improve sharply with increasing dimethyl polysiloxane content, compared with the properties of pure polypropylene (comparison example 1). The flow characteristics (MFI) are effected only at relatively high dimethylpolysiloxane contents (Example 3) whereas the dimensional stability under heat (Vicat softening temperature) is only slightly reduced by the addition of dimethylpolysiloxane.

The mixtures of the present invention are therefore particularly suitable for the production of elastic polypropylene based moulded products which are dimensionally stable under heat.

TABLE 1

|  | Measuring unit | Ex. 1 | Ex. 2 | Ex. 3 | Comparison Example 1 |
|---|---|---|---|---|---|
| Polypropylene | parts by weight | 97.5 | 95 | 90 | 100 |
| Dimethylpolysiloxane | parts by weight | 2.5 | 5.0 | 10.0 | — |
| Melt index[1] MFI (230° C./5kg) | g/10 min | 3.3 | 3.6 | 10.2 | 3.0 |
| Permanent elongation[2] | % | 65 | 53 | 57 | 89 |
| Vicat softening temperature[3] | °C. | 150 | 147 | 144 | 154 |
| Notched impact strength[4] (23° C.) | kJ/m² | 7.6 | 8.3 | 7.5 | 5.0 |

[1]according to DIN 53753
[2]Method of measuring: Elongation of a standard shoulder rod (length 75 mm, thickness 1mm) to twice its length (100% elongation) at the rate of 10 mm/min; immediate removal of load, permanent elongation measured at zero tension.
[3]according to DIN 53460
[4]according to DIN 53453

EXAMPLE 2 and COMPARISON EXAMPLES 2 and 3 (Table 2)

Test samples were prepared in the same manner as described in Examples 1 to 3 from polypropylene and dimethylpolysiloxanes having viscosities (at 20° C.) of 25 000 cSt, cold setting point −50° C. and 100 000 cSt, cold setting point −50° C., respectively, and tested as described therein. The results are summarised in Table 2.

Comparison Examples 2 and 3 show that moulded products obtained from mixtures of isotactic polypropylene and diorganosiloxanes which are outside the viscosity range required for the mixture of the present invention are substantially inferior in their mechanical properties.

TABLE 2

|  | Measuring unit | Ex.2 | Comparison Ex.2 | Comparison Ex.3 |
|---|---|---|---|---|
| Polypropylene | parts by weight | 95 | 95 | 95 |
| Dimethylpolysiloxane | parts by weight | 5 | 5 | 5 |
| Viscosity of | cSt at | 50000 | 25000 | 100000 |

TABLE 2-continued

| | Measuring unit | Ex.2 | Comparison Ex.2 | Comparison Ex.3 |
|---|---|---|---|---|
| the dimethyl-polysiloxane | | | | |
| Melt index[1] MFI (230° C./5 kg) | g/10 min. | 3.6 | 4.5 | 3.5 |
| Permanent elongation[2] | % | 53 | 68 | 64 |
| Vicat softening point temperature[3] | °C. | 147 | 145 | 146 |
| Notched impact strength[4] (23° C.) | kJ/m$^2$ | 8.3 | 6.9 | 7.4 |

[1] see Table 1
[2] see Table 1
[3] see Table 1
[4] see Table 1

We claim:

1. A homogeneous thermoplastic mixture comprising (A) from 85 to 99.5% by weight of isotactic polypropylene having an isotactic portion of more than 90% by weight and a melt index of from 0.1 to 20 g/10 min at 230° C. under a load of 5 kg; and
(B) from 15 to 0.5% by weight of a liquid, saturated diorganopolysiloxane having a viscosity of from 30,000 to 80,000 cSt at 20° C.

2. A homogeneous thermoplastic mixture as claimed in claim 1 wherein component (A) is present in an amount of from 93 to 97% by weight and component (B) is present in an amount of from 3 to 7% by weight.

3. A homogeneous thermoplastic mixture as claimed in claim 1 wherein the isotactic polypropylene has a melt index of from 0.1 to 5 g/10 min at 230° C. and under a load of 5 kg.

4. A homogeneous thermoplastic mixture as claimed in claim 1 wherein the diorganopolysiloxane is a dialkylpolysiloxane having from 1 to 4 carbon atoms in each alkyl group.

5. A homogeneous thermoplastic mixture as claimed in claim 4 wherein the dialkylpolysiloxane is a dimethylpolysiloxane.

6. A homogeneous thermoplastic mixture as claimed in claim 1 wherein the diorganopolysiloxane is a methyl-phenylpolysiloxane.

7. Heat moulded articles prepared from a homogeneous thermoplastic mixture as claimed in claim 1.

* * * * *